United States Patent
Oh et al.

(10) Patent No.: US 9,880,874 B2
(45) Date of Patent: Jan. 30, 2018

(54) PROCESS OPERATING METHOD AND APPARATUS THEREOF

(71) Applicant: Samsung Electronics Co., Ltd., Suwon-si, Gyeonggi-do (KR)

(72) Inventors: Hae-Seok Oh, Gumi-si (KR);
Jeong-Yeon Kim, Daegu (KR);
Dae-Beom Park, Gumi-si (KR);
Lae-Hyuk Bang, Gumi-si (KR);
Chul-Hyung Yang, Gumi-si (KR);
Gyu-Cheol Choi, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 14/469,815

(22) Filed: Aug. 27, 2014

(65) Prior Publication Data
US 2015/0067705 A1 Mar. 5, 2015

(30) Foreign Application Priority Data
Aug. 27, 2013 (KR) ........................ 10-2013-0101518

(51) Int. Cl.
*G06F 9/48* (2006.01)
*G06F 9/54* (2006.01)

(52) U.S. Cl.
CPC ............ *G06F 9/4806* (2013.01); *G06F 9/485* (2013.01); *G06F 9/54* (2013.01)

(58) Field of Classification Search
CPC ................................. G06F 9/485; G06F 9/4806
See application file for complete search history.

(56) References Cited

U.S. PATENT DOCUMENTS

| | | | | |
|---|---|---|---|---|
| 2009/0083376 A1* | 3/2009 | Dowlmg | ................ | H04L 29/06 709/203 |
| 2010/0205617 A1* | 8/2010 | Hogan | ................... | G06F 9/485 719/328 |
| 2013/0031424 A1* | 1/2013 | Srivastava | ............ | G06F 11/008 714/47.2 |
| 2013/0332867 A1* | 12/2013 | Dunn | ................... | G06F 9/4443 715/764 |
| 2013/0332941 A1* | 12/2013 | Ramesh | ................ | G06F 9/4831 719/314 |

FOREIGN PATENT DOCUMENTS

KR   10-0924647 B1   10/2009

OTHER PUBLICATIONS

Collins, C.; Galpin, M.; Kappler, M, "Andriod in Practice" (2012), Manning Publications Co., pp. 1-623.*
The Unix Group, "The Single UNIX® Specification, Version 2" (Jun. 21, 2012), pp. 1-4 [retrieved from https://web.archive.org/web/20120621091350/http://pubs.opengroup.org/onlinepubs/7908799/xsh/fork.html].*
Wilson, B., "I/O in Google Chrome" (Oct. 8, 2008), pp. 1-7 [retrieved from https://blog.chromium.org/2008/10/io-in-google-chrome.html].*

* cited by examiner

*Primary Examiner* — Brian W Wathen
(74) *Attorney, Agent, or Firm* — Jefferson IP Law, LLP

(57) ABSTRACT

A process operating method is provided. The method includes determining an execution application, generating an application process for the determined execution application, loading the determined execution application from a secondary memory to the generated application process, generating a platform child process that is a child process of a platform process, and loading a predetermined sub-module of the application to the platform child process.

14 Claims, 7 Drawing Sheets

PROCESS OPERATING METHOD AND APPARATUS THEREOF

CROSS-REFERENCE TO RELATED APPLICATION(S)

This application claims the benefit under 35 U.S.C. § 119(a) of a Korean patent application filed on Aug. 27, 2013 in the Korean Intellectual Property Office, and assigned Serial number 10-2013-0101518, the entire disclosure of which is hereby incorporated by reference.

TECHNICAL FIELD

The present disclosure relates to a process operating method in a software platform for driving an electronic device, and an apparatus thereof More particularly, the present disclosure relates to running a sub-module of an application in a child process of the platform.

BACKGROUND

Multi-process processing technology has been considered an important technology in a computing environment. Recently, a portable electronic device, such as a smart phone, a tablet Personal Computer (PC), or the like, which includes the functions of a portable terminal in addition to the functions of a general PC or a Personal Digital Assistant (PDA), have come into the spotlight. Increasingly, smart phones or the tablet PCs include a high capacity memory and a high performance CPU, and include a software platform (hereinafter referred to as a platform) for supporting the execution of various applications that require complex and advanced tasks, voice/data communication, interoperation with a PC, or the like. Thus, the importance of multi-process processing technology for portable electronic devices that have limited hardware resources such as a limited amount of power, a limited storage space, or the like is also increasing.

A platform that is driven in an electronic device needs to effectively manage the limited resources, and, thus, a process management module of the platform actively participates in operating the process that is currently driven. For example, the process management module may transfer a process which is relatively less frequently used from a Random Access Memory (RAM), which is a system memory, to a storage memory, so as to overcome the limitation of the limited RAM capacity. As another example, to overcome the limited amount of power, when the process management module executes a multi-process function, the process management module drives a single process at a time, and supports a driving state transition among a plurality of processes in response to a request from a user or a system so as to make it seem to a user as though the plurality of processes are executed simultaneously.

FIG. 1 is a view illustrating an example of a state transition diagram of a process according to the related art.

Referring to FIG. 1, the process management module of the platform defines the state of a process based on a process life cycle policy and uses a method of transitioning the state of the process. For example, the process management module may manage the state of a process by defining the state of the process to be one of the three states: "running," "ready," and "blocked." The "running" state refers to a state in which the process is actually driven by a platform, and a process in a "running" state is loaded to a RAM and the power of the electronic device is used for driving the loaded process. The "ready" state refers to a state that is ready for transition to the "running" state, and a process in a "ready" state is loaded to a RAM but the power of the electronic device is not used. The "blocked" or "suspended blocked" state refers to a state that may be transitioned to the "running" state or "ready" state, and a process in a "blocked" state is not loaded to a RAM and the power of the electronic device is not used.

The process management module may transition the state of each process so as to maximally utilize resources of the electronic device based on the process life cycle policy. For example, when the transition frequently occurs among the processes, at least one process is determined to be the "running" or "ready" state. As another example, when a predetermined process requires RAM space with a large capacity, the process that is currently loaded to the RAM as the "ready" state may be deleted from the RAM by transitioning the state to the "blocked" state.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a process operating method in a software platform for driving an electronic device, and an apparatus thereof.

When a multi-process function is executed, a process generated to be a child process, among the processes, may be generated by being assigned a property value identical to a parent process generally, such as a priority of the parent process and the like. In this instance, the child process may have a lower priority than the parent process and thus, may be disadvantageous for real-time processing and the like. Also, the child process may not continuously maintain a "running" state due to the transition of the state of the parent process based on the policy of the process management module.

In some cases, a function that is executed by a predetermined child process may need to be continuously "run" or independently operated, irrespective of the effect from the parent process. However, the described process operating method may fail to provide appropriate support.

To address the described problems, embodiments of the present disclosure propose a more effective process operating method.

In particular, an embodiment of the present disclosure provides a method of enabling an engine module of an application to be operated in a process that is not affected by a life cycle management policy of a process management module.

In accordance with an aspect of the present disclosure, a method of operating a process is provided. The method includes determining an execution application, generating an application process for the determined execution application, loading the determined execution application from a secondary memory to the generated application process, generating a platform child process, which is a child process of a platform process, and loading a previously set sub-module of the application to the platform child process.

In accordance with another aspect of the present disclosure, an electronic device including a process operating device is provided. The electronic device includes a secondary memory configured to store a plurality of applications, and a controller configured to load an application stored in the secondary memory into an internal primary memory so as to control execution of the corresponding application to generate an application process that loads the application and controls the execution of the loaded application, and to control a platform child process that is generated by the platform process and executes a sub-module of the loaded application.

In accordance with another aspect of the present disclosure, a platform structure for operating a process is provided. The platform structure includes a platform process configured to operate an application, an application process configured to load an application and control the execution of the loaded application, and a platform child process generated by the platform process and configured to execute a sub-module of the loaded application, wherein the platform process is configured to generate the platform child process in response to a request from the application process, and to execute a function of loading the sub-module of the application to the platform child process, and wherein the application process is configured to request the platform process to generate the platform child process, and to control communication between the sub-module of the application loaded to the platform child process and a main-module of the application.

According to various embodiments of the present disclosure, a process is more effectively operated. In particular, an engine module of an application is operated in a process that is not affected by a life cycle management policy of a process management module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the present disclosure, "process" refers to a "running program" corresponding to activity of a CPU in a computing environment, inclusively indicates execution of job or task, and indicates a job that is registered on a kernel and is managed by the kernel.

Figure 1:
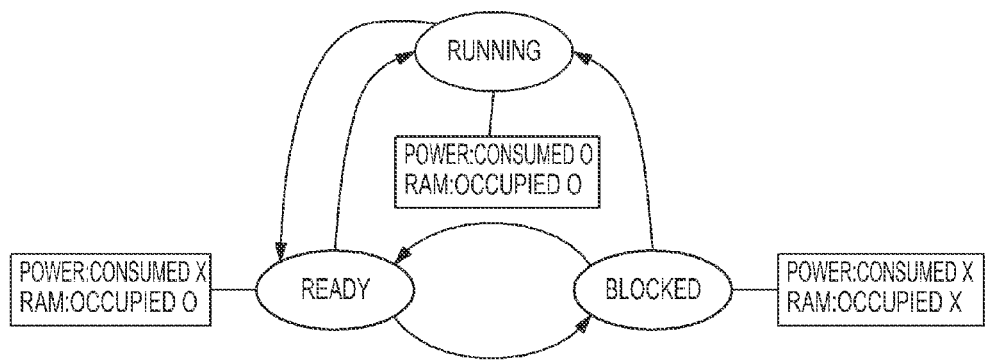
FIG. 1 is a view illustrating an example of a state transition diagram of a process according to the related art.
Figure 2:
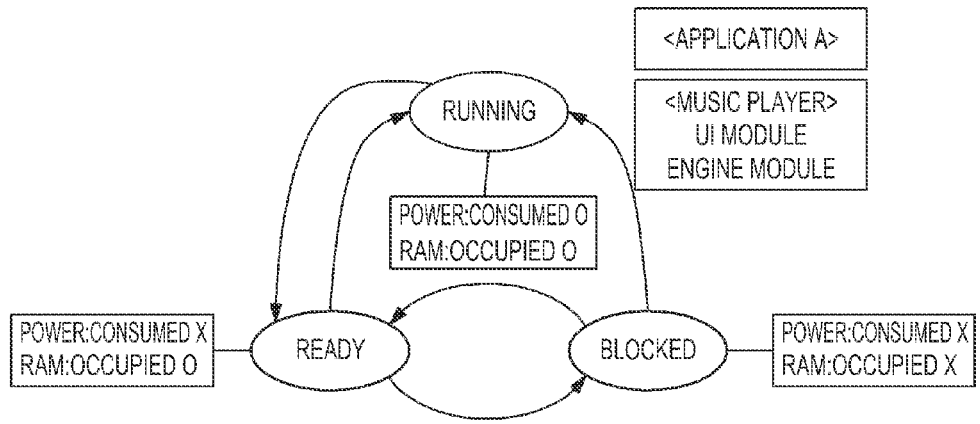
FIG. 2 is a view illustrating an example of a state transition diagram of a process when an application is executed according to an embodiment of the present disclosure.

FIG. 2 is a view illustrating an example of a state transition diagram of a process when an application is executed.

Referring to FIG. 2, <music player> is illustrated as an example of an application. A process operating state will be described from the perspective of execution of an application with reference to FIG. 2. An application that is currently executed is driven in a process of a "running" state, and an application that is not currently executed is driven in a process of a "ready" or "blocked" state.

The application may be functionally divided into a User Interface (UI) function that controls interaction with a user and an engine function that controls the execution of a practical operation, and the embodied parts may be defined to be a UI module and an engine module, respectively, which are described below in relation to various embodiment of the present disclosure. When the UI module and the engine module are configured to operate in a single process, both the UI module and the engine module are loaded to a Random Access Memory (RAM), irrespective of interaction with a user while a corresponding application is executed. For example, a music player may be configured to include a UI module that manages an interface that interacts with a user and an engine module that plays back music. When background music is played back, the UI module is loaded to the RAM for execution of a corresponding application although the interface that interacts with the user is not needed. Accordingly, in this instance, it is recognized that both a process of the application that is currently executed and a process for playing back the background music are in the running state, as illustrated in FIG. 2.

Thus, when an application is executed, the UI module that implements a UI function that controls interaction with the user and the engine module that implements an engine function that controls the execution of a practical operation are separately embodied, and each is driven in a separate process so that resources are effectively managed.

Figure 3A:
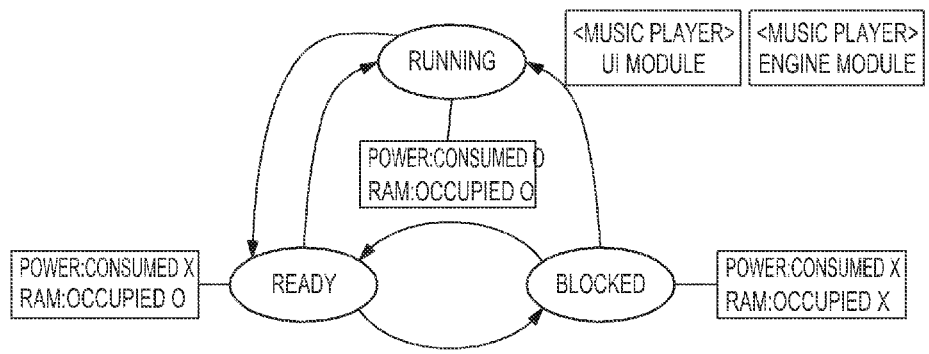
FIGS. 3A and 3B are other views illustrating examples of a state transition diagram of a process when an application is executed according to an embodiment of the present disclosure.
Figure 3B:
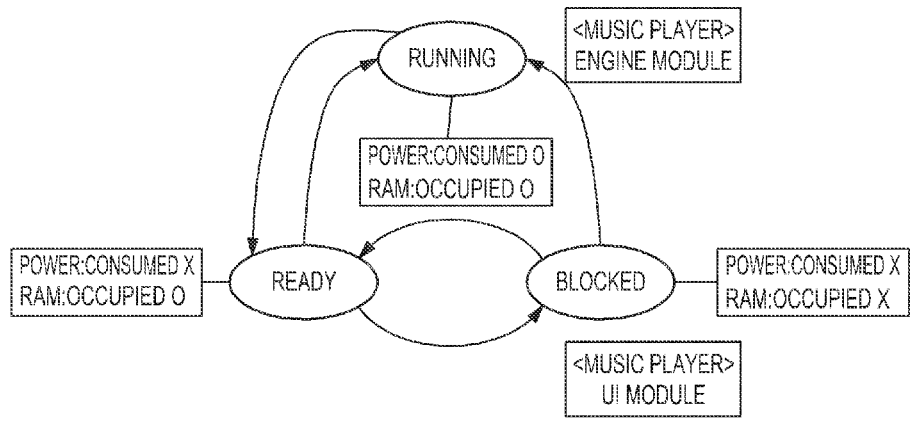

FIGS. 3A and 3B are views illustrating examples of state transition diagrams of a process when an application is executed.

Referring to FIGS. 3A and 3B, in a case of a music player application, when a user executes the music player application and uses a music playback and control UI, both a process in which a UI module is currently driven and a process in which an engine module is currently driven are put into a "running" state, as shown in FIG. 3A. When the user changes a mode into a background music playback mode, the process in which the UI module is currently driven is transitioned to a "ready" state or "blocked" state so as to minimize the use of resources, and the process in which the engine module is currently driven maintains the "running" state so as to play back the background music, as shown in FIG. 3B.

Figure 4:
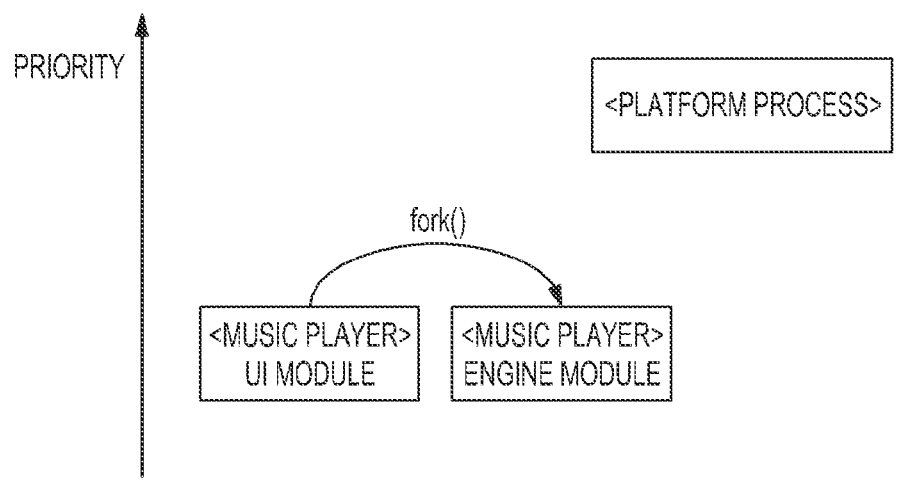
FIG. 4 is a view illustrating an example of a state transition diagram of a platform process when an application is executed according to an embodiment of the present disclosure.

FIG. 4 is a view illustrating an example of a state transition diagram of a platform process when an application is executed according to an embodiment of the present disclosure.

Referring to FIG. 4, a process is illustrated in which the engine module is driven to be generated as a child process, which is generated by the process in which the UI module is executed, through a "fork( )" function of Linux, "CreateProcess( )" of Windows, or the like. However, in this instance, the process in which the engine module is executed may be assigned with a property value identical to a parent process, such as a process priority or the like. Accordingly, when the process in which the engine module is executed has a lower priority than a process that is generated by a platform, the lower priority of the process in which the engine module is executed may be disadvantageous for real-time processing and the like, and may also cause difficulty in continuously maintaining the "running" state due to the policy of a process management module of the platform.

Therefore, there is provided a method of enabling an engine module of an application to be operated in a process that is not affected by a life cycle management policy of a process management module through various embodiments of the present disclosure.

Figure 5:
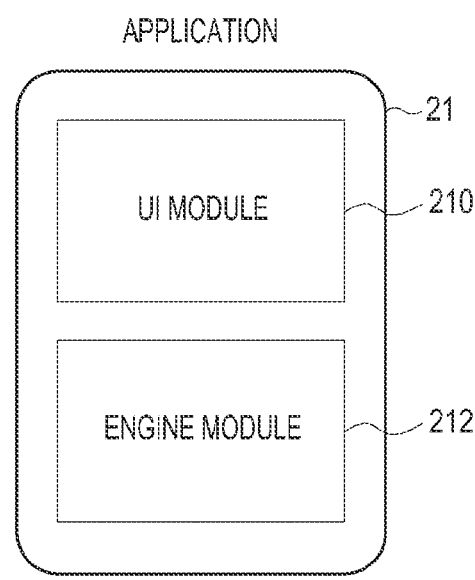
FIG. 5 is a functional diagram of an application according to an embodiment of the present disclosure.

FIG. 5 is a functional diagram of an application according to an embodiment of the present disclosure.

Referring to FIG. 5, an application 21 implementing an embodiment of the present disclosure may be configured to include a UI module 210 and an engine module 212. The UI module 210 controls a function of interaction with a user. The engine module 212 controls a function of executing a practical operation.

Although FIG. 5 illustrates that the application 21 is configured to include the UI module 210 and the engine module 212 according to an embodiment of the present disclosure, in various embodiments the application 21 does not necessarily include the UI module 210 and the engine module 212. That is, an application is formed of at least one module which is functionally distinguished, and the present disclosure may be applied to any application formed of various functional modules through various embodiments of the present disclosure. Generally, the application 21, which is executed in a portable electronic device, is formed of the UI module 210 and the engine module 21. Accordingly, hereinafter, an embodiment of the present disclosure in which the application 21 is formed of the UI module 210 as a main module and the engine module 212 as a sub-module is described.

Figure 6:
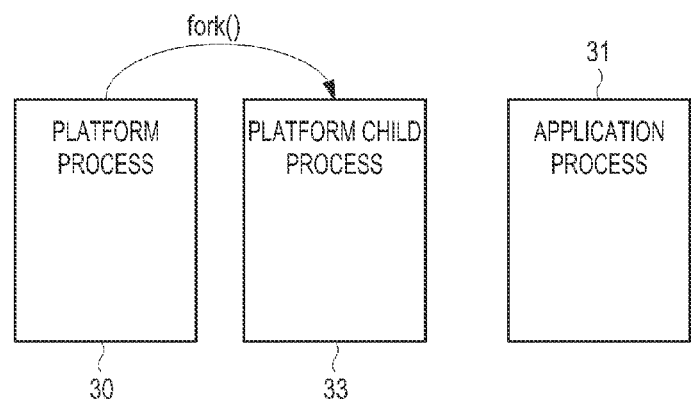
FIG. 6 is a diagram schematically illustrating processes managed by a process management module of a platform according to an embodiment of the present disclosure.

FIG. 6 is a diagram schematically illustrating processes managed by a process management module of a platform according to an embodiment of the present disclosure.

Referring to FIG. 6, a process management module is configured to generate and manage a platform process 30, a platform child process 33, and an application process 31. The platform process 30 manages a process for operating an application, generates the platform child process 33 in response to a request from the application process 31, and loads a predetermined sub-module, for example, an engine module, from among functional modules of the application, to the platform child process 33.

The platform child process 33 is generated by the platform process 30 and executes a sub-module of the application, for example, an engine module, and has a property identical to the platform process 30.

The application process 31, which is a process for executing an application, requests the platform process 30 to generate the platform child process 33, and executes communication with a sub-module of an application, which is loaded to the platform child process 33, for example, an engine module, with another functional module of the application, for example, a UI module which is a main module.

FIGS. 7A to 7D are views illustrating examples of a process generating state for executing an application, according to an embodiment of the present disclosure.

Figure 7A:
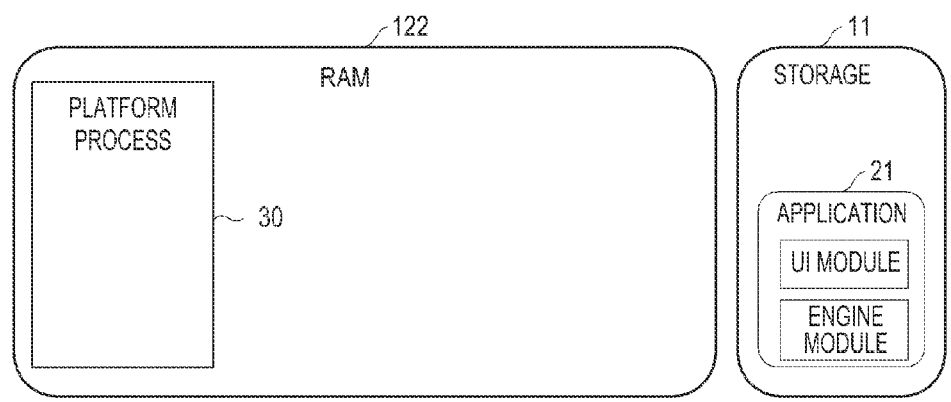
FIGS. 7A, 7B, 7C, and 7D are views illustrating examples of a process generating state for executing an application according to an embodiment of the present disclosure.

Referring to FIG. 7A, the platform process 30 exists in a RAM area 122 before an application is executed, and application 21 exists in a storage memory 11.

Figure 7B:
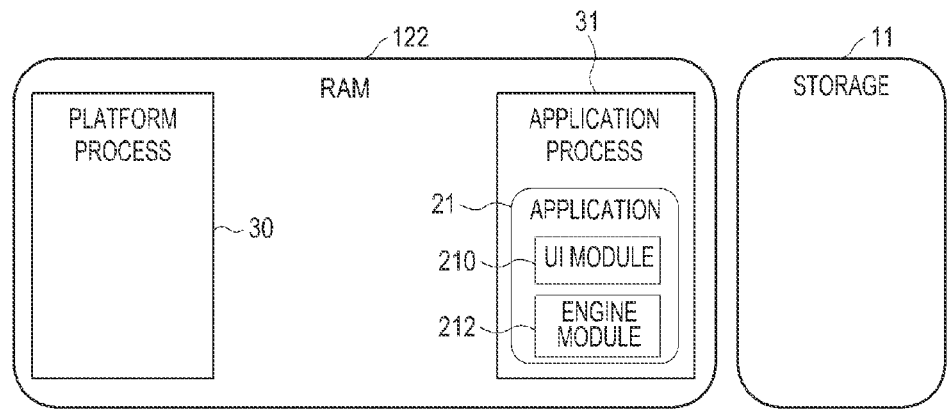

Referring to FIG. 7B, when execution of the corresponding application is determined by a request from a user, another event, or the like, the application process 31 for executing the application is generated in the RAM area 122, and the application 21 is loaded from the storage memory 11 to the application process 31. The loaded application 21 may include the UI module 210 and the engine module 212.

Figure 7C:
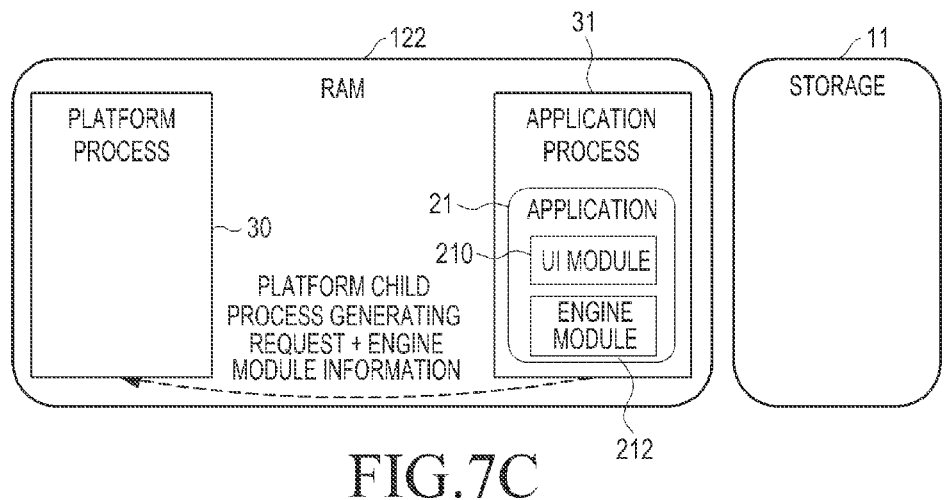

Subsequently, the application process 31, to which the application 21 is loaded, transmits, to the platform process 30, a request for generating a platform child process, together with information associated with the engine module 212, as illustrated in FIG. 7C.

Figure 7D:
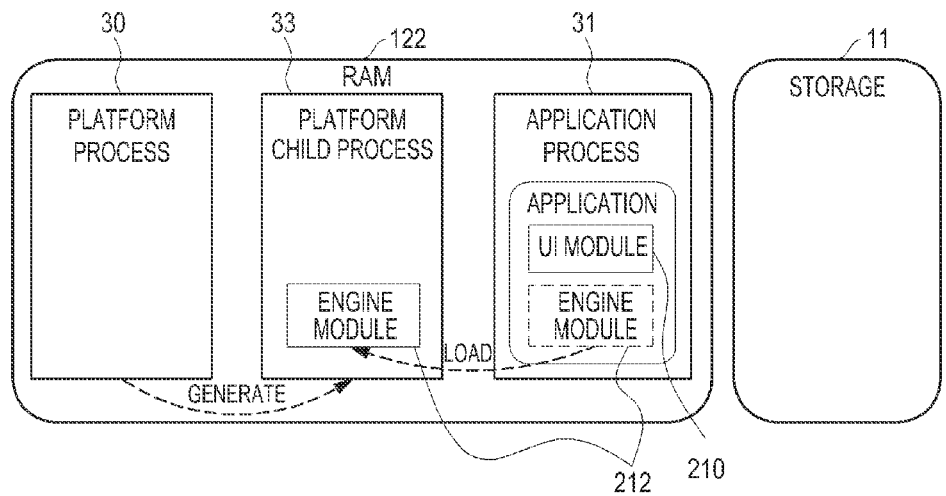

The platform process 30 that receives the request from the application process 31 generates the platform child process 33 and loads the engine module 212 to the platform child process 33 based on the information included in the request from the application process 31, as illustrated in FIG. 7D.

Referring to FIGS. 7A to 7D, the engine module 212 of the application 21 according to an embodiment of the present disclosure may be operated in a process, that is, the platform child process 33, which is not affected by a life cycle management policy of the process management module with respect to the application process 21. Accordingly, the engine module 212 of the application 21 is operated in a process (i.e. platform child process 33) having a priority identical to the platform process 30 and thus, may be advantageous for real-time processing and the like.

As described above, according to an embodiment of the present disclosure, the platform child process 33 is generated from the platform process 30, and a part of the application 21 is separated so as to be executed in the platform child process 33, and thus unit processes for processing a real-time multi-process function may have a relatively smaller memory foot print than before the separation. Through the above, context switching may be improved and the load of an entire system may be reduced, and the load of a platform is reduced when a process is switched for real-time processing, which is advantageous for real-time processing.

Figure 8:
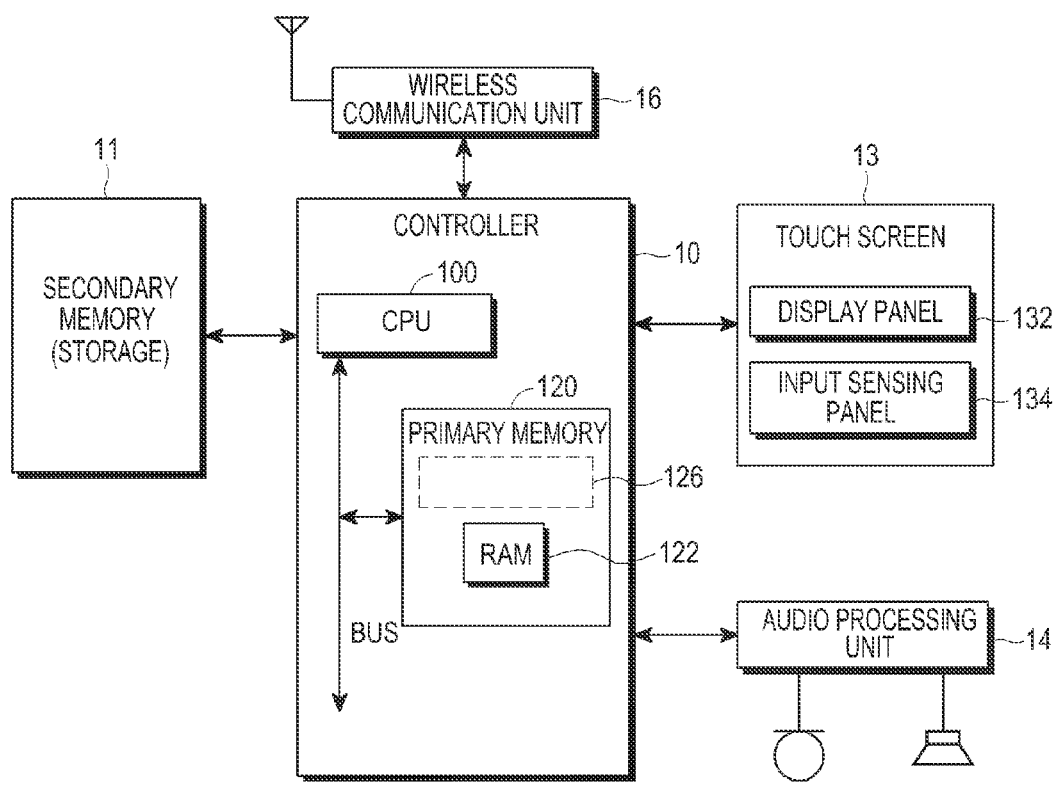
FIG. 8 is a block diagram schematically illustrating an electronic device in which embodiments of the present disclosure may be applied and implemented.

FIG. 8 is a block diagram schematically illustrating an electronic device in which the above-described process operation function may be implemented according to an embodiment of the present disclosure.

Referring to FIG. 8, the electronic device may have a configuration typical of, for example, a portable electronic device, and may be configured to include a controller 10, a storage memory 11, a touch screen 13, an audio processing unit 14, and a wireless communication unit 16. The device of FIG. 8 may comprise a structure corresponding to, for example, a smart phone, a portable phone, and the like. In addition, various embodiments of the present disclosure may include devices, such as a Portable Multimedia Player (PMP), a Personal Digital Assistant (PDA), an MP3 player, a tablet Personal Computer (PC), a personal navigation device, a portable game console, and the like. The wireless communication unit 16 of FIG. 8 may or may not be included in some embodiments. In addition, an electronic device according to an embodiment of the present disclosure may include a notebook or a general PC.

Referring to FIG. 8, the touch screen 13 may be configured to include a display panel 132 that displays output information that is output from a portable electronic device, and an input sensing panel 134 though which a user provides various inputs. In an example, the display panel 132 may be generally formed of a Liquid Crystal Display (LCD) screen or an Organic Light Emitting Diodes (OLED) screen having an active matrix or a passive matrix, and may be embodied to be structurally integrated with the input sensing panel 134.

The display panel 132 may display various screens associated with various operation states, menu states, the execution of an application, services, or the like of a corresponding portable electronic device. The input sensing panel 134 is configured to include at least one panel that may sense a single or multi-touch input, a drag input, a writing input, a drawing input, and the like provided by a user using various objects such as a finger, an electronic pen (not illustrated), and the like.

The wireless communication unit 16 may be a component part that may be included when a corresponding portable electronic device supports a wireless communication function such as a mobile communication function and the like. In particular, in order to perform an operation for transmitting/receiving and processing a wireless signal for the mobile communication function, the wireless communication unit 16 may be configured to include an antenna, a Radio Frequency (RF) unit, and a MOdulator/DEModulator (MODEM).

The audio processing unit 14 may include a speaker (SPK) for outputting an audio signal of a portable terminal and a microphone (MIC) for collecting an audio signal. Also, the audio processing unit 14 may include a voice codec for processing an audio signal input and output through the speaker and the microphone, and when a phone call function is executed in association with a mobile communication function, the audio processing unit 14 receives a voice of a user or outputs an audible sound to the user, or outputs processing sounds corresponding to various operations, or outputs sounds corresponding to various digital audio contents, video contents, or the like.

The secondary memory 11, which is a storage memory, is a component part for storing various programs and data that may be executed in a portable electronic device. For example, the storage memory 11 may be embodied as a high capacity storage device for storing various applications and various multimedia-related contents. The storage memory 11 may be embodied as a flash memory, a memory card (for example, a Secure Digital (SD) card, a memory stick, and the like) that is installed in a portable electronic device, or the like. Depending on cases, the storage memory 11 may be configured to include a Hard Disk Drive (HDD) or a Solid State Drive (SSD).

The controller 10 generally controls the above described functional parts, and controls a flow of data and signals among the functional parts so as to control general operations of a portable electronic device. In particular, the controller 10 may control a UI and an execution screen associated with execution of an application to be displayed on the touch screen 13, and may switch and control an operation of a portable electronic device according to a user input that is input through the touch screen 13.

The controller 10, as a processor, may be mainly formed of a Central Processor Unit (CPU) 100 (or Application Processor (AP)), include an operation program for operating a basic system of a corresponding electronic device, and include a primary memory 120 which is a system memory for temporarily storing data for executing various operations. The primary memory 120 is configured to generally include an application provided from the secondary memory 11 for executing a predetermined operation of an electronic device and the RAM 122 for temporarily storing data generated while the operation is executed. Functionally, a process management module 126 is included in the primary memory 120. The process management module 126 may be configured to execute various functions for managing a process, and executes a spooler function, a job scheduler function, a process scheduler function, and a traffic controller function. The CPU 100 and the primary memory 120 are connected with each other through an internal bus. A software platform according to an embodiment of the present disclosure may be implemented in the first memory 120, and the process management module 126 may execute a function associated with the software platform.

Although it is described that the first primary memory 120 is embodied as the RAM 122, the primary memory 120 may be regarded as a configuration including the RAM 122 and a register or a cache memory of a processor (CPU/AP) for executing an application, and the secondary memory 11 may be regarded as a memory, besides the primary memory 120. A portable electronic device according to an embodiment of the present disclosure may be embodied to include the above described component parts. In addition, the portable electronic device may include a power unit including a charger battery and the like, and also, may be configured to fundamentally or additionally include functional parts that are applied to a current mobile communication terminal, such as a Global Positioning System (GPS) unit, a vibration motor, a camera module, and the like.

Figure 9:
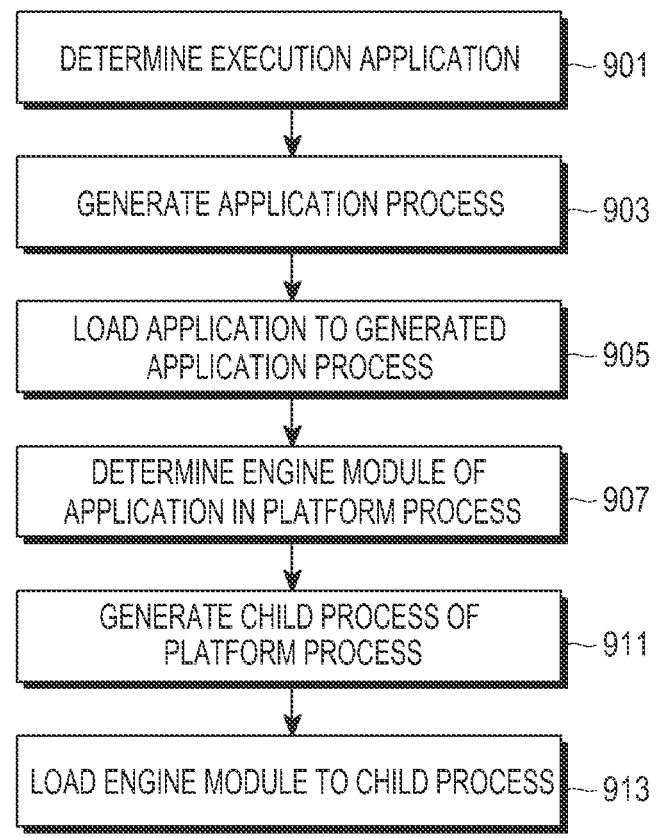
FIG. 9 is a flowchart illustrating a process operating method according to an embodiment of the present disclosure.

FIG. 9 is a flowchart illustrating a process operating method according to an embodiment of the present disclosure. In an embodiment, the process operating method may be executed under a control of the process management module 126 of FIG. 8.

Referring to FIG. 9, in operation 901, an execution application corresponding to a request from a user, another event, or the like, is determined.

Subsequently, in operation 903, an application process for the determined execution application is generated in a primary memory, for example, a RAM area. In operation 905, the determined execution application is loaded from a storage memory to the generated application process. In this instance, the loaded application includes a UI module and an engine module.

Subsequently, in operation 907, the engine module of the application is determined in a platform process, which is executed when the platform process receives a request for generating a platform child process together with information associated with the engine module, from the application process.

In operation 911, the platform process generates the platform child process. In operation 913, the engine module is loaded to the generated child processor.

It will be appreciated that the various embodiments of the present disclosure can be implemented in a form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be seen that a memory which may be included in the mobile terminal corresponds to an example of the storage medium suitable for storing a program or programs including instructions by which the various embodiments of the present disclosure are realized. Accordingly, the present disclosure includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present disclosure appropriately includes equivalents of the program.

While the present disclosure has been shown and described with reference to various embodiments thereof, it will be understood by those skilled in the art that various changes in form and details may be made therein without departing from the spirit and scope of the present disclosure as defined by the appended claims and their equivalents. Accordingly, the scope of the present disclosure shall not be determined by the above-described embodiments, and is to be determined by the following claims and their equivalents.

What is claimed is:

1. A method of operating a process, comprising:
    determining an execution application;
    generating an application process for the determined execution application;
    loading the determined execution application from a secondary memory to a primary memory in the generated application process;
    generating a platform child process that is a child process of a platform process configured to operate the loaded application; and
    loading a previously set sub-module of the application to the platform child process from the application process,
    wherein the application is composed of a main module and the sub-module, each of which is operable in a separate process,
    wherein the application process, the platform process, and the platform child process are generated and managed by at least one processor configured to execute a process management module,
    wherein the application process executes communication with the sub-module loaded in the child platform process,
    wherein the platform child process has a priority identical to the platform process, and
    wherein the loaded application is executed by operating the application process and the platform child process.

2. The method of claim 1, wherein the generating of the platform child process is executed when a request for generating the platform child process is received from the application process together with information associated with the sub-module.

3. The method of claim 1, wherein the platform child process has a property value identical to the platform process.

4. The method of claim 3, wherein the property value includes a priority value of greater priority than a priority value of the application process.

5. The method of claim 1,
    wherein the sub-module includes an engine module configured to control the execution of a practical operation of the application in the corresponding application, and
    wherein the application is configured to include the engine module and a user interface (UI) module that controls a UI function for interaction with a user.

6. An electronic device including a process operating device, the electronic device comprising:
    a secondary memory configured to store a plurality of applications; and
    at least one processor configured to:
        load an application stored in the secondary memory into an internal primary memory so as to control execution of the corresponding application,
        generate an application process that loads the application to be executed, and controls execution of the loaded application,
        control a platform child process that is generated by a platform process configured to operate the loaded application, and
        execute a predetermined sub-module of the loaded application,
    wherein the application is implemented by a main module and the sub-module, each of which is operable in a separate process,
    wherein the application process, the platform process, and the platform child process are generated and managed by a process management module,
    wherein the application process executes communication with the sub-module loaded in the child platform process,
    wherein the platform child process has a priority identical to the platform process, and
    wherein the loaded application is executed by operating the application process and the platform child process.

7. The electronic device of claim 6,
    wherein the platform process is further configured to:
        generate the platform child process in response to a request from the application process, and
        load the sub-module of the application into the platform child process, and wherein the application process is further configured to:
    request the platform process to generate the platform child process, and
    control communication between the sub-module of the application loaded to the platform child process and the main module of the application.

8. The electronic device of claim 7, wherein the platform child process has a property value identical to the platform process.

9. The electronic device of claim 8, wherein the property value includes a priority value of greater priority than a priority value of the application process.

10. The electronic device of claim 7,
    wherein the sub-module includes an engine module configured to control a function that executes a practical operation of the application, and
    wherein the main module includes a UI module configured to control a UI function for interaction with a user in the corresponding application.

11. A non-transitory computer-readable recording medium having instructions stored thereon that, when executed, configure at least one processor to generate a platform structure for operating a process, the platform structure comprising:
    a platform process configured to operate an application,
    an application process configured to:
        load an application, and
        control the execution of the loaded application, and
    a platform child process generated by the platform process, configured to execute a predetermined sub-module of the loaded application,
    wherein the platform process is further configured to:
        generate the platform child process in response to a request from the application process, and
        execute a function of loading the sub-module of the application to the platform child process,
    wherein the application process is further configured to:
        request the platform process to generate the platform child process, and
        control communication between the sub-module of the application loaded to the platform child process and a main-module of the application,
    wherein the application is implemented by the main-module and the sub-module, each of which is operable in a separate process,
    wherein the application process, the platform process, and the platform child process are generated and managed by a process management module,
    wherein the application process executes communication with the sub-module loaded in the child platform process,
    wherein the platform child process has a priority identical to the platform process, and
    wherein the loaded application is executed by operating the application process and the platform child process.

12. The non-transitory computer-readable recording medium of claim 11, wherein the platform child process has a property value identical to the platform process.

13. The non-transitory computer-readable recording medium of claim 12, wherein the property value includes a priority value of greater priority than a priority value of the application process.

14. The non-transitory computer-readable recording medium of claim 11,
    wherein the sub-module includes an engine module configured to control a function that executes a practical operation of the application, and
    wherein the main module includes a UI module configured to control a UI function for interaction with a user in the corresponding application.

* * * * *